United States Patent [19]

Greenhalgh

[11] 4,182,619
[45] Jan. 8, 1980

[54] METHOD OF TOUGHENING GLASS SHEETS

[75] Inventor: Geoffrey Greenhalgh, Orrell, Near Wigan, England

[73] Assignee: Triplex Safety Glass Company Limited, Birmingham, United Kingdom

[21] Appl. No.: 916,555

[22] Filed: Jun. 19, 1978

[30] Foreign Application Priority Data

Jun. 23, 1977 [GB] United Kingdom ............... 26362/77

[51] Int. Cl.² ............................................. C03B 27/00
[52] U.S. Cl. ........................................ 65/114; 65/104; 65/115
[58] Field of Search ........................ 65/104, 114, 115

[56] References Cited

U.S. PATENT DOCUMENTS 2,042,610  6/1936  Littleton ................................. 65/114

FOREIGN PATENT DOCUMENTS 1808117 11/1967 Fed. Rep. of Germany ............. 65/115

Primary Examiner—Arthur D. Kellogg
Attorney, Agent, or Firm—Burns, Doane, Swecker & Mathis

[57] ABSTRACT

A method of thermally toughening a glass sheet in which the glass sheet is advanced through a quenching station and subjected to a localized gas flow. The localized gas flow is pulsed at a repetition frequency related to the speed of advance of the glass through the quenching station. The toughened glass sheet so produced has a distribution of regions of more highly toughened glass interspersed with regions of lesser toughened glass.

6 Claims, 9 Drawing Figures

METHOD OF TOUGHENING GLASS SHEETS

BACKGROUND OF THE INVENTION

This invention relates to the production of flat or curved sheets of thermally toughened glass, such as are used for example as motor vehicle side or rear windows.

In most countries there are official regulations specifying the fracture requirements for toughened glass sheets which are to be used as side or rear windows for motor vehicles Typically such regulations specify that the toughened glass sheets shall be fractured by localised impact at a defined position on the glass sheet, two particular positions being at the geometrical centre of the glass sheet and at a position adjacent the edge of the sheet. It is then required that areas of the fractured glass sheet should be selected where the particle count is a minimum and where the particle count is a maximum and limitations are placed on the minimum and maximum particle counts permissible in such areas. The minimum particle count permissible determines the maximum size of particles resulting from fracture so as to limit the danger of laceration by larger particles subsequent to fracture of the glass sheet in an accident. The maximum particle count permissible determines the minimum fineness of particles resulting from accidental fracture of the glass sheet so as to limit the danger of ingestion of fine glass particles. At present motor vehicle side and rear windows are made from glass of about 4.0 mm to 6.0 mm thickness and can be uniformly toughened so as to meet official fracture requirements.

For example glass sheets of thickness 4 mm and above meet the proposed E.E.C. standard referred to below if uniformly toughened to have a central tensile stress in the range 55 MN/m$^2$ to 59 MN/m$^2$. However in the interest of reducing weight there is now a trend towards the use of thinner glass in motor vehicles e.g. of about 3.0 mm thickness, glass of thickness in the range 2.5 mm to 3.5 mm being of particular interest.

In the draft standard under discussion by the European Economic Community (EEC) it is required that the number of particles in any 5 cm×5 cm square traced on the fractured glass, excluding a 3 cm wide band around the edge of the glass sheet and a circular area of 7.5 cm radius around the point from which fracture is initiated, should be 50 at the minimum and 300 at the maximum.

The proposed E.E.C. standard also has the requirement that the fractured glass sheet shall not contain any elongated particles with jagged ends of more than 6 cm in length, such particles being referred to as "splines."

British Standard No. BS 5282 entitled "ROAD VEHICLE SAFETY GLASS" is less restrictive than the proposed E.E.C. standard in that it specifies for glass less than 4 mm thickness a minimum particle count of 40 in a 5 cm×5 cm square may be permitted and the maximum permitted particle count in a 5 cm×5 cm square may be permitted and the maximum permitted particle count in a 5 cm×5 cm square may be 400. The British Standard also basically prohibits the presence of splines of more than 6 cm in length in the fractured test glass. The British Standard also requires that no splines are to be present in the fractured glass sheet.

It had been found difficult to toughen thinner glass sheets to meet the official fracture requirements, this difficultly being particularly evident in a size greater than about 1100 mm×500 mm this is about the size of the smallest vehicle rear window in current production. Many vehicle side windows are also of about this size or greater.

In U.S. Pat. No. 4,128,690 and assigned to the same assignee as the present application there is described and claimed a glass sheet for use as a side or rear window for a motor vehicle and of thickness in the range 2.5 mm to 3.5 mm having characteristics which have been discovered enable the sheet to meet at least the official fracture requirement laid down in British Standard No. BS 5282, the glass sheet being differentially quenched to produce in the glass sheet a distribution of regions of more highly toughened glass interspersed with regions of lesser toughened glass, the average central tensile stress in the glass sheet being in the range of from a maximum of 62 MN/m$^2$ for all glass thickness from 2.5 mm to 3.5 mm to a minimum of 56.5 MN/m$^2$ for 2.5 mm glass varying inversely with thickness down to a minimum of 53 MN/m$^2$ for 3.5 mm thick glass, and there being a distribution of medium toughened glass areas interspersed among said more highly toughened and said lesser toughened regions in the glass sheet and in which there are major and minor principal stresses acting in the plane of the glass sheet, the difference between said major and minor principal stresses in at least some of said medium toughened areas being at a maximum in the range 8 MN/m$^2$ to 25 MN/m$^2$, the major principal stresses in adjacent ones of such medium toughened areas being in substantially different directions, and the distance between the centres of such adjacent areas being in the range 15 mm to 30 mm, the number and location of such adjacent areas being sufficient that upon fracture there is an absence of splines of more than 6 cm in length in the glass sheet.

A glass sheet having the above characteristics was produced, as described in U.S. Pat. No. 4,128,690, by quenching a distribution of regions of the glass sheet at a maximum rate so that interspersed regions of the glass sheet were simultaneously quenched at a minimum rate, and regulating said maximum quenching rate and the size and spacing of the regions of the glass sheet which are quenched at a maximum rate to give the above characteristics.

In carrying out the above method quenching was effected by directing quenching jets at the glass sheet, and imparting a vertical oscillation or a circular oscillation to the quenching jets to produce the required distribution of regions of the glass sheet quenched at a maximum rate. The quenching could also be effected by directing stationary quenching jets at the glass sheet to produce the required distribution of regions of the glass sheet quenched at a maximum rate.

We have now discovered that a distribution of areas of highly and lesser toughened glass can be produced by a method in which flow of gas towards a moving hot glass sheet is pulsed so as to subject adjacent areas of the glass to different rates of heat transfer from the glass.

SUMMARY

According to the invention there is provided a method of toughening a glass sheet comprising advancing the glass sheet through a quenching station where the sheet is subjected to at least one localised gas flow and pulsing that gas flow at a repetition frequency related to the speed of advance of the glass through the quenching station to induce in the glass a distribution of regions of more highly toughened glass interspersed with regions of lesser toughened glass.

In one embodiment of the invention the glass sheet is advanced between flows of quenching gas at the quenching station to produce overall toughening of the glass, and said at least one localised glas flow is superimposed on said flow of quenching gas.

The invention may be applied to a glass sheet which is being advanced horizontally either on a roller conveyor or on a gaseous support. From this aspect the invention provides a method in which the glass is advanced horizontally between said flows of quenching gas and is subjected to a plurality of said localised gas flows by directing towards at least one face of the glass, as it passes through the quenching station, gas jets which are spaced apart in a row transversely to the direction of advance of the glass, and pulsing said gas flows to produce said distribution of regions of more highly toughened glass interspersed with regions of lesser toughened glass in which distribution there are areas in which the principal stresses acting in the plane of the glass sheet are unequal.

In one embodiment of the invention the advancing glass is subjected to an array of gas jets which are spaced apart in rows transversely of the direction of advance of the glass with the rows spaced apart in the direction of advance, and the gas jets are pulsed at a rate related to the speed of advance of the glass so that localised areas of the glass are subjected to accumulative chilling by successive pulsed jets.

In one embodiment of the invention the sheet of glass is advanced horizontally on a gaseous support through the quenching station, and said at least one gas jet is directed towards the upper face of the sheet at the quenching station.

The gas jets thus superimpose localised chilling of the upper surface of the glass on the generalised chilling effected by the chilling air flows over both faces of the glass.

In an alternative embodiment of the invention the sheet of glass is advanced horizontally on rollers through the quenching station, and said at least one gas jet is directed towards at least one face of the sheet at the quenching station.

The invention also comprehends a toughened glass sheet for use as a side or rear window for a motor vehicle produced by the method of the invention.

BRIEF DESCRIPTION OF THE DRAWINGS

In order that the invention may be more clearly understood some embodiments thereof will now be described, by way of example, with reference to the accompanying drawings in which.

DESCRIPTION OF THE PREFERRED EMBODIMENTS

Figure 1:
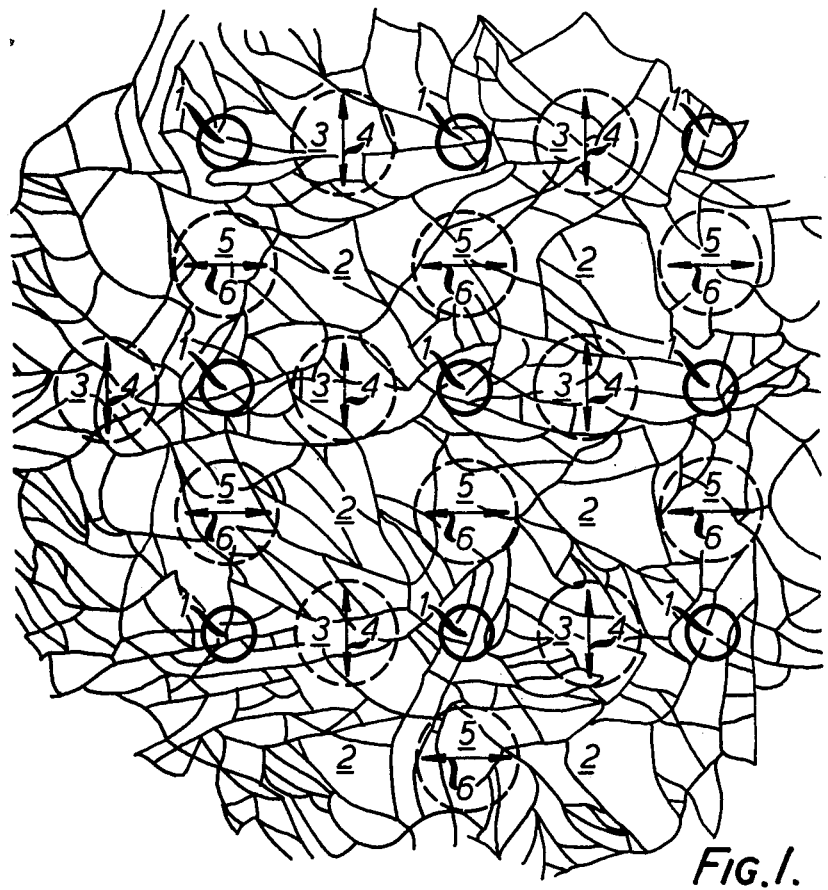
FIG. 1 illustrates the fracture pattern of a differentially toughened glass sheet suitable for a side or rear window of a motor vehicle produced by the method of the invention.

FIG. 1 illustrates the fracture pattern of a toughened glass sheet suitable for use as the side window or rear window of a motor vehicle produced by the method of the invention. The glass sheet has a distribution, in rectangular array, of localised areas 1 of more highly toughened glass in the glass sheet interspersed with areas 2 of lesser toughened glass. Areas 3 of the glass have a medium toughened stress and in each of the areas 3 the principal stresses are unequal with the major principal stress acting in the direction indicated by the arrows 4.

Areas 5 of the glass also have a medium toughening stress and have unequal principal stresses with the major principal stress acting in the direction indicated by the arrows 6. The major principal stress 6 in each area 5 acts in a direction substantially perpendicular to the direction of the major principal stress 4 in each of the areas 3.

Normal toughening stresses are produced in each of the areas 1, 2, 3 and 5, of the glass sheet to an extent which is dependant on the rate of quenching of those areas. A high central tensile stress which is of equal magnitude in all directions in the plane of the glass sheet is produced in the more highly toughened areas 1, a low central tensile stress is produced in the lesser toughened areas 2, and compensating compressive stresses are produced in both surfaces of the glass sheet.

The medium toughening stresses produced in the areas 3 and 5 of the glass sheet are a combination of the normal toughening stresses of equal magnitude in all directions in the plane of the glass sheet, and additional area stresses produced in the areas 3 and 5 to the different rates at which the adjacent areas 1 and 2 are cooled and contract. These area stresses are not of equal magnitude in all directions in the plane of the glass sheet. The central tensile stress in the areas 3 and 5 of the glass sheet due to the combined effect of the normal toughening stresses and the area stresses can be resolved into unequal principal stresses in the plane of the glass sheet namely a major principal tensile stress and a minor principal tensile stress acting at right angles to the major principal tensile stress.

As shown by the arrows 6 in the areas 5 the major principal tensile stress 6 acts in a direction perpendicular to the direction of the major principal tensile stress 4 in the areas 3.

The size of the particles produced in a fractured glass sheet depends on the degree of toughening of the glass and in general the fineness of the particles increases with the degree of toughening. Hence the particles of relatively small size are produced in the more highly toughened areas 1, in the lesser toughened area 2 larger particles are produced, and in the areas 3 and 5 having a medium toughening stress particles of medium size are produced. This distribution of small, larger and medium sized particles is produced over the whole surface of the fractured glass sheet, and there are not splines in the fracture. The requirements of the proposed E.E.C. standard and British Standard No. BS 5282 with regard to minimum and maximum particle sizes are met when the glass is toughened to the degree described in U.S. Pat. No. 4,128,690 referred to above.

When a toughened glass sheet is fractured the cracks tend to run substantially perpendicular to the direction of major principal stress in the glass. This is illustrated in FIG. 1 where the cracks tend to run perpendicular to the direction of the major principal stresses 4 and 6 in the areas 3 and 5 and are directed towards the more highly toughened areas 1 where particles of smaller size are produced. Since the major principal stresses in adjacent areas 3 and 5 are perpendicular to one another, a wavy type of fracture pattern results in which the size of the areas 3 and 5 limits the maximum length of the particles which can be produced. Hence the fracture pattern does not include elongated particles, or splines, of the kind which are found in the customary radial type of fracture pattern produced in a conventional uniformly toughened glass sheet.

The glass sheet having such a stress distribution is produced according to the invention by subjecting at least one face of the glass sheet to pulsed localised gas flows for a predetermined time during its advance between quenching gas flows of a more generalised nature such as are used in the conventional toughening of a glass sheet. The effect of a localised gas flow is to induce in the toughened glass the rectangular distribution of regions of more highly toughened glass interspersed with regions of lesser toughened glass just described with reference to FIG. 1.

Figure 2:
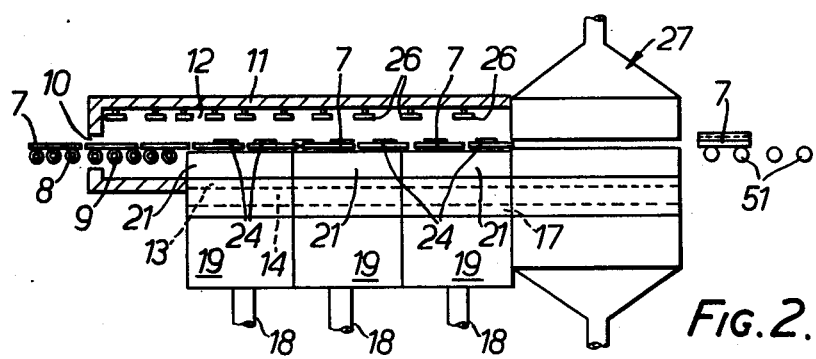
FIG. 2 is a side elevation partly in section of apparatus for carrying out the invention in which the glass sheet to be differentially toughened is transported on a gaseous support as it is heated and quenched.

Apparatus as shown in FIG. 2 may be employed for transporting glass sheets on a gaseous support through a heating station to a quenching station. Flat sheets of glass 7 which are cut to the required shape for use as a side or rear window of a vehicle are fed in sequence on to asbestos covered conveyor rollers 8 at the loading end of the apparatus. The rollers 8 have collars 9 of slightly larger diameter than the major surfaces of the rollers and the glass sheets ride on the collars 9. The rollers 8 are inclined at a slight angle to the horizontal, for example an angle of about 5°. The sheets 7 are fed in sequence by the rollers 8 through an inlet 10 into a heating furnace comprising a tunnel structure including a roof 11 and side walls 12. The sheets 7 are conveyed through the first part of the heating furnace on further asbestos covered rollers 8 and are then conveyed through the remaining length of the furnace on a gaseous support generated by a base bed structure. The bed structure comprises a base plate 13 which is a flat plate of heat-resistant stainless steel and which forms the roof of an exhaust chamber indicated at 14. The plate 13 is uniformly apertured for the passage of hot gases from outlet apertures 15, FIG. 3. Each of the apertures 15 for the passage of hot gases upwardly through the base plate 13 is defined by the bore of a supply tube 16 which is fitted into a hole in the base plate. The tops of the tubes 16 are flush with the top surface of the base plate 13 and the tubes 16 extend downwardly from the base plate 13 and are located at their lower ends in holes in a floor 17 of the exhaust chamber 14. Hot gases are supplied through ducts 18, FIG. 1 to plenum chambers 19. The floor 17 of the exhaust chamber 14 forms the roof of one of the plenum chambers 19.

The base plate 13 is also formed with equally interspersed exhaust openings 20 communicating with the exhaust chamber 14. Outlet apertures, not shown, in the walls of the exhaust chamber 14 allow gases to escape either to atmosphere or for collection and recirculation.

The upper face of the base plate 13 is an accurately flat surface formed to receive in intimate engagement the lower face of a series of removable blocks 21 which are machined from heat-resistant stainless steel with their lower faces machined flat so that they can be slid into the apparatus from one side into gas-tight engagement with the upper surface of the base plate 13. The blocks 21 each have gas escape apertures 22 communicating with the outlet apertures 15 and gas exhaust apertures 23 communicating with the exhaust openings 20. Hot gases supplied through the ducts 18 into the plenum chambers 19 proceed upwardly through the tubes 16 and the apertures 22 in the block 21 and escape and expand above the upper surface of the block 21 to create a gaseous support under the advancing glass sheets 7.

Gas is continually released from the apertures 22 into the gaseous support for each glass sheet and simultaneously gas escapes from the gaseous support through the exhaust apertures 23 into the exhaust chamber 14 and thence to the outlet apertures.

The upper surfaces of the blocks 21 are transversely tilted so as to lie at the same small angle to the horizontal, for example 5°, as the conveyor rollers 8. The upper surfaces of the collars 9 on the conveyor rollers 8 are slightly higher than the level of the upper surface of the first block 21 so that as soon as each glass sheet 7 becomes completely and uniformly supported on the gaseous support it tends to slide down the transverse incline until it is in engagement with rotating discs 24 mounted alongside the blocks 21 on vertical spindles (not shown) which extend upwardly from drive motors (not shown) arranged outside the furnace. The drive motors drive the discs at a controlled speed commensurate with the rate of advance of the glass sheets on to the gaseous support by the rollers 8. The collars 9 may be arranged so that if the sheets are already touching the collars then they will be in a position to be driven by the edge discs 24 without any substantial movement of the sheets down the transversely sloping upper surface of the first block 21.

The glass sheets are, as shown in FIG. 2, placed on the conveyor rollers end-to-end so that a succession of flat glass sheets 7 are advanced into the furnace by the driving action of the conveyor rollers.

As the glass sheets advance over the rollers 8 in the first part of the furnace and then subsequently over the blocks 21 on the gaseous support created by the presence of the sheets over the blocks they become heated by the hot gases of the support and by radiant heat from heaters 26 mounted in the roof structure over the path of travel of the glass sheets.

The edge discs 24 maintain the registration of the glass sheets in the furnace and also provide drive to cause the forward movement of the sheets. However, some of the discs 24 may be free running and act as rotatable guides.

In the apparatus of FIG. 2 there are three sections to the furnace which are of identical construction. The construction of the last section is illustrated in FIG. 3, and by the time each glass sheet 7 reaches the end of the furnace the glass is at a temperature of the order of 630° C. to 670° C. for soda-lime-silica glass suitable for the thermal toughening of the glass by subjecting the glass to quenching gas flows, usually flows of air at ambient temperature.

Figure 3:
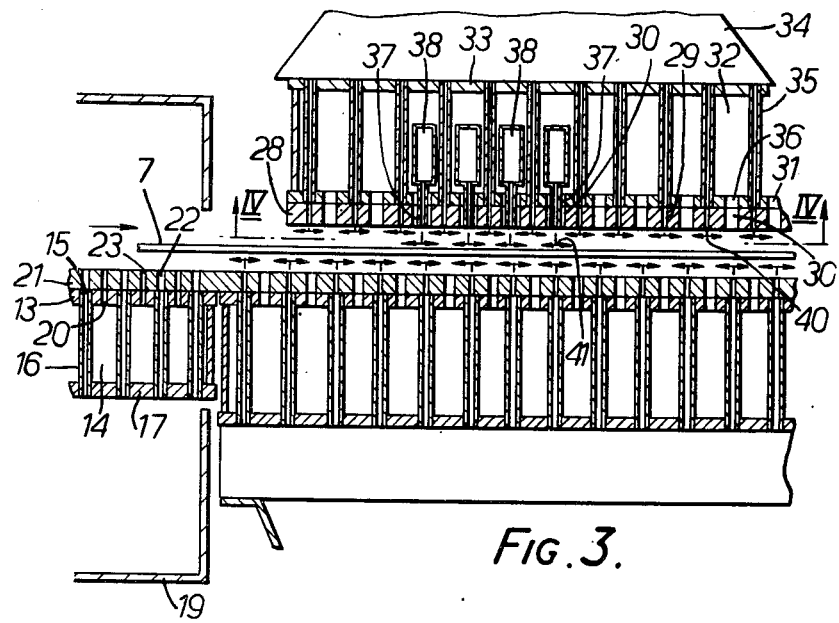
FIG. 3 is a sectional elevation of the quenching station forming part of the apparatus FIG. 2.

The advance of the hot glass sheets continues to a quenching station which is indicated generally at 27 in FIG. 2 and is shown in more detail in FIG. 3. At the quenching station the glass sheets are supported on a gaseous support generated above a bed of identical construction to the bed in the furnace except that the bed is supplied with chilling air at ambient temperature. The presence of each glass sheet advancing into the quenching station 27 from the furnace generates a gaseous cushion between the sheet and the upper surface of the bed which provides both the required support for the sheet and a flow of chilling air against the bottom surface of the glass sheet. The advance of the glass sheet is continued by means of rotating discs, not shown.

In the quenching section there is a generalised flow of quenching gas contacting the upper surface of the glass sheet which gas flow has a substantially identical chilling effect on the upper surface of the glass as the chilling effect of the lower surface by the gaseous support. The gas flows on the upper surface are generated from an upper gas supply and exhaust equipment of identical construction to the base bed supplying gas to and exhausting gas from the gaseous support.

Figure 4:
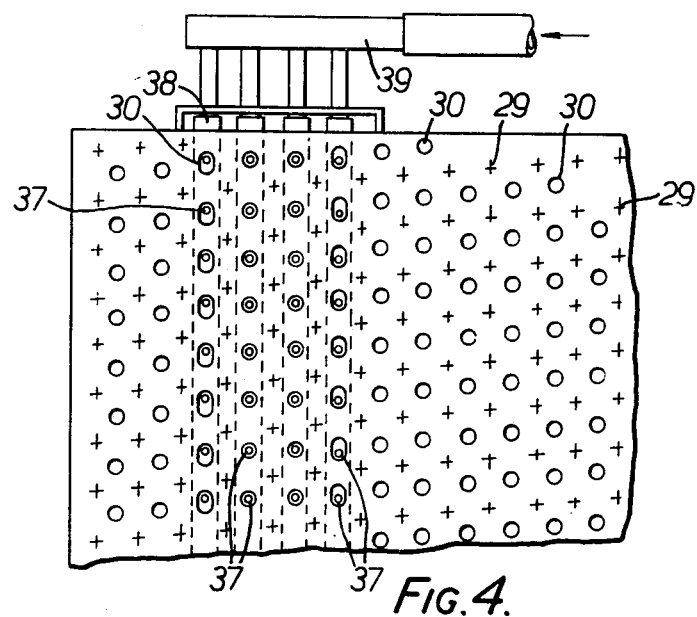
FIG. 4 is an underneath view of the upper part of the quenching station on line IV—IV of FIG. 3.

As shown in FIG. 3 the upper part of the quenching station comprises a plate 28 of asbestos-based, heat-resistant material which has gas supply apertures 29 and gas exhaust apertures 30. These apertures are also shown in FIG. 4. The plate 28 is fixed to an apertured base plate 31 of a gas exhaust chamber 32. The matching surfaces of the plates 28 and 31 are machined flat so as to be gas tight. The roof of the exhaust chamber 32 is a plate 33 which also forms the base of a plenum chamber 34 to which chilling air at ambient temperature is supplied. The chilling air passes through apertures in the plate 33 and is conducted down tubes 35 extending through the exhaust chamber 32 the lower ends of which tubes are fixed in the base plate 31 of the exhaust chamber and communicate with the gas supply apertures 29 in the plate 28. The gas exhaust apertures in the plate 28 are aligned with exhaust apertures 36 in the plate 31 so that gas can escape from above the glass sheet into the exhaust chamber 32 whose walls have apertures so that the exhaust gases can be exhausted to atmosphere or collected and recirculated.

In order to produce the stress distribution described with reference to FIG. 1 the hot glass sheet which is being subjected to the generalised quenching gas flows at the quenching station is also subjected to localised gas flows by subjecting the upper surface of the glass to a rectangular array of gas jets which are spaced apart in rows transversely of the direction of advance of the glass with rows spaced apart in the direction of advance. The distribution of the gas supply apertures 29 and gas support apertures 30 in the plate 28 is slightly inclined to the direction of advance of the glass, as illustrated in FIG. 4, in order to minimise any striping effect which could otherwise be produced in the form of a polarisation pattern on the glass surface. The array of gas jets is provided by an array of gas supply nozzles 37 which are connected in rows to ducts 38 located in the exhaust chamber 32. The nozzles 37 extend downwardly through specially enlarged gas exhaust apertures 30 in the plate 28 as illustrated in FIGS. 3 and 4. One end of each of the ducts is connected to an air supply manifold 39 located outside the exhaust chamber alongside the quenching station.

Figure 5:
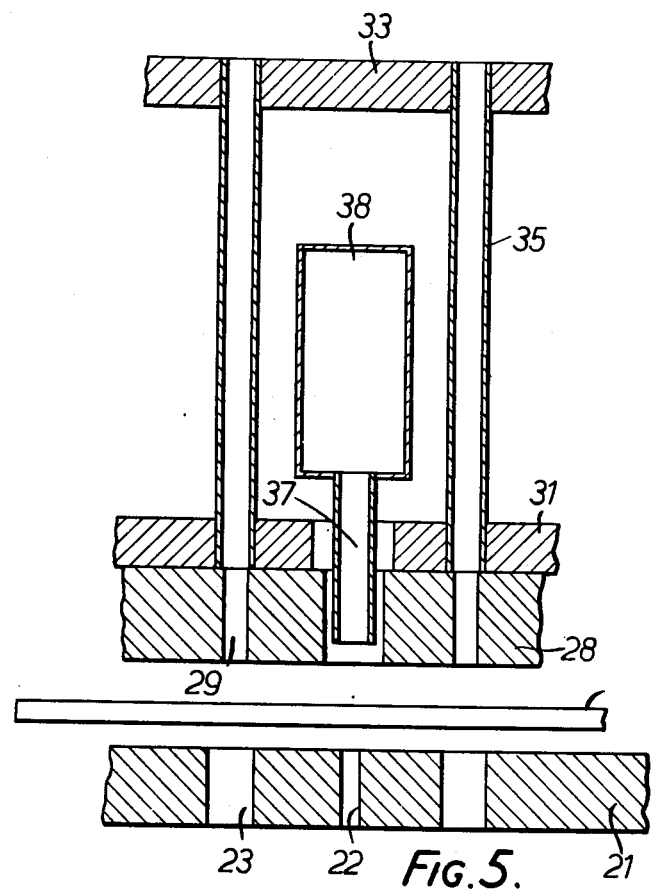
FIG. 5 is a detailed view of part of the quenching station of FIGS. 3 and 4.

In the embodiment illustrated there are four rows of nozzles 37 spaced apart at the same pitch as the gas exhaust apertures 30 in the direction of advance of the glass sheet. In FIG. 3 the quenching air flows supplied from the gas release apertures 29 are illustrated by the arrows 40 and the localised gas jets directed at the upper surface of the glass are illustrated by the arrows 41. The mounting of the ducts 38 with their nozzles 37 is illustrated in more detail in FIG. 5.

Figure 6:
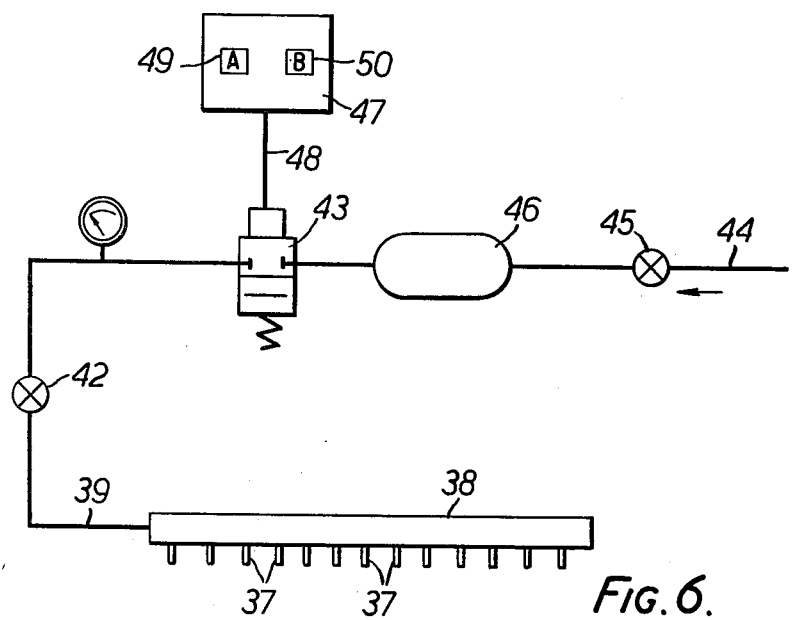
FIG. 6 is a schematic diagram showing one way of pulsing gas supplies to the quenching station.

FIG. 6 illustrates regulation of the air supply to the manifold 39 and therefore regulation of the gas jets. The manifold 39 is connected through a pressure regulator 42 to the outlet of a solenoid operated spool valve 43 of conventional design. Air is supplied from an air supply 44 through a regulator 45 to an air receiver 46 which is connected to the inlet of the spool valve 43. The air supply 44 is a supply of compressed air.

The spool valve is controlled by an electronic timing unit 47 connected by control lines indicated at 48 to the spool valve. There are two setting controls on the timing unit 47. One of these 49 controls the frequency of opening the valve 43 to supply pulses of compressed air on the manifold 39 to the nozzles 37. The other control 50 controls the length of each pulse of compressed air.

When each hot glass sheet is advancing through the generalised quenching which it receives by the quenching gas flows adjacent both its surfaces at the quenching station, it is also subjected to localised gas flows from the nozzles 37 for a predetermined time. These gas flows are pulsed at a pulse repetition frequency and with a pulse length related to the speed of advance of the glass through the quenching station. The controls 49 and 50 of the timing unit 47 are set so that each increment of the glass sheet passes from one row of nozzles 37 to the next row of nozzles 37 in the time between pulses. That is, the localised regions of the glass which have received more intense quenching by reason of the pulsed gas jets from the first row of nozzles are beneath the second row of nozzles by the time the second pulse of compressed air is supplied to the nozzles. These localised areas are therefore subjected to accumulative chilling by the successive pulsed jets of gas. This localized quenching of the upper surface of the glass superimposed on the general overall quenching which is being achieved at the quenching station produces in the glass the distribution of regions of more highly toughened glass interspersed with regions of lesser toughened glass described with reference to FIG. 1 and the resultant toughened glass sheet which emerges from the quenching station on rollers 51 has the required stress pattern.

Figure 7:
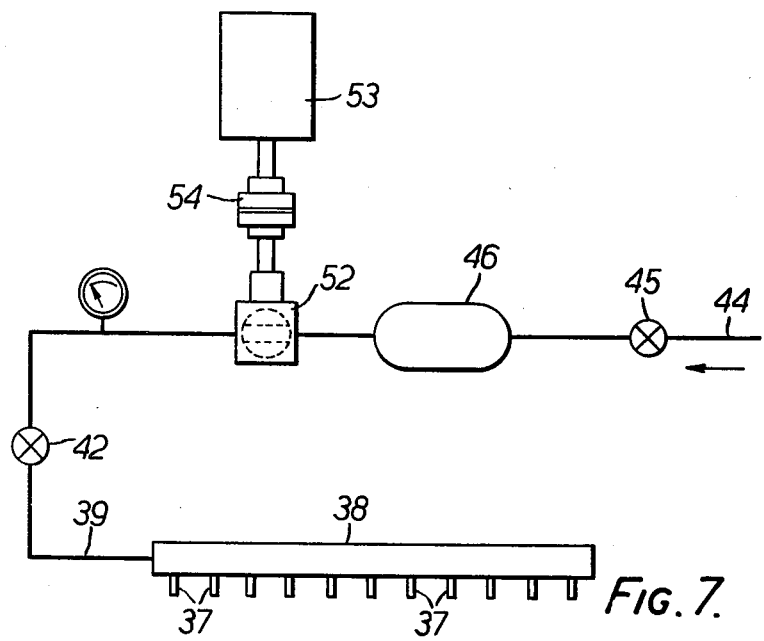
FIG. 7 illustrates another way of pulsing gas supplies to the quenching station.

Instead of the electronically controlled solenoid operated spool valve of FIG. 6, the pulsing of the supply of compressed air to the manifold 39 may be achieved by means of a rotary ball valve 52, FIG. 7, driven from a variable speed motor drive unit 53 which is connected to the rotary ball of the valve 52 through a coupling 54. The relationship between pulse repetition frequency and pulse length cannot be varied with a valve of this kind although the repetition frequency and pulse length can be varied together by variation of the speed of the motor.

In one example of operation of the apparatus described with reference to FIGS. 2 to 7 the compressed air supply is at 690 kPa on line 44. The diameter of the bore of each of the nozzles 37 is 4.8 mm and the nozzle spacing is at 38 mm square pitch. The spacing of the ends of the nozzles from the upper surface of the glass supported on the gas cushion at the quenching station is 6 mm to 12 mm.

The frequency and duration of the pulsing of the compressed air supply depends on the length of the glass sheet and its speed. With a speed of travel of the glass of 190 mm/s there is one pulse every 0.2 seconds and a duration of each pulse is 0.1 seconds.

The product had an average central tensile stress of between 55 MN/m² to 62 MN/m² with a principal stress difference in at least some of the areas at a maximum between 6 MN/m² and 15 MN/m². One result achieved was 8.4 MN/m².

For a nozzle spacing of 38 mm square pitch, the distance between the centres of adjacent areas in which the principal stress difference is a maximum and is in different directions is 27 mm. Nozzle spacings in the range 22 mm to 42 mm square pitch result in the distance between the centres of such adjacent areas being in the range 15 mm to 30 mm.

Figure 8:
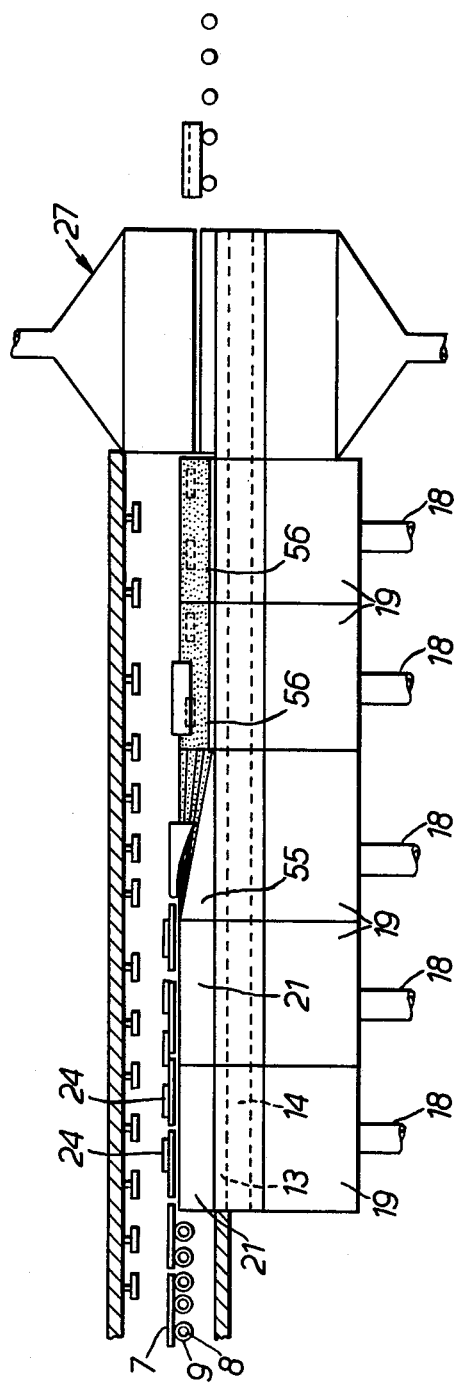
FIG. 8 is a view similar of FIG. 2 of apparatus for carrying out the method of the invention including means for bending the hot glass sheet prior to the advance of that sheet through the quenching station.

The method of the invention can be employed for the production of the required stress pattern in bent glass sheets using apparatus illustrated in FIG. 8 which apparatus is described in more detail in United Kingdom Pat. No. 1,190,373. After heating, each glass sheet advances on to a transitional block 55 whose thickness along its longitudinal centre line is the same as the thickness of the two blocks 21 but whose upper face is machined as a series of flats of gradually increasing angle which result in the upper surface of the block 55 having the desired final curved form of the glass sheets. The glass advances on to this transitional block and is heated to a temperature such that it can sag downwardly to conform to the shape of the block. The block is apertured to provide a gaseous support created beneath the hot deformable glass as it glides over the block. This downward sagging increases progressively as the glass sheet advances and the glass which is still hot and deformable moves from the block 55 onto a final part of the bed 56 whose cross section conforms to the now curved shape of the glass sheet. The glass sheet advances over this curved section of the bed to the quenching station the upper and lower part of which are also suitably curved with a curved distribution of the nozzles 37 in order to provide the overall quenching of the glass sheets simultaneously with the localised quenching by the gas jets from the nozzles 37.

Figure 9:
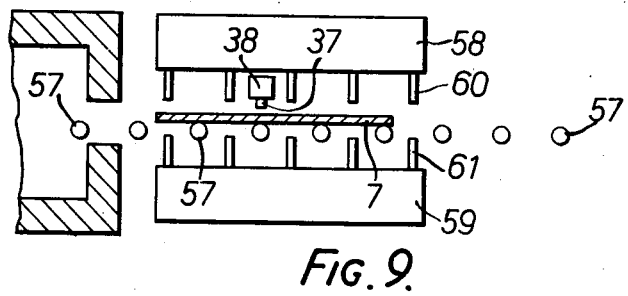
FIG. 9 illustrates the toughening of a glass sheet by the method of the invention while the sheet is supported on a roller conveyor.

FIG. 9 illustrates the toughening of a glass sheet 7 which is being advanced on a roller conveyor comprising a series of horizontal rollers 57.

The conveyor carries the glass sheet through a heating furnace indicated at 58 to a quenching station where the rollers carry the glass sheet between upper and lower blowing boxes 58 and 59. The box 58 has an array of blowing nozzles 60 which point downardly towards the roller conveyor so as to direct generalised quenching gas flows on to the upper surface of the glass sheet 7. The nozzles 60 are arranged at a slight angle to the direction of advance of the glass sheet in the same way as the supply and exhaust apertures in FIG. 4.

Similarly the lower blowing box 59 has upwardly projecting blowing nozzles 61 which are directed through the gaps between the rollers 57 and are also arranged at a slight angle to the direction of advance of the glass sheet.

The flows of quenching gas from the nozzles 60 and 61 is supplemented by localised gas flows from a row of gas supply nozzles 37 connected to a duct 38 and mounted between adjacent rows of upper nozzles 60. The nozzles 37 direct localised gas jets at the upper surface of the glass in the same way as described with reference to FIGS. 3 and 4 and are pulsed as described with reference to FIG. 6 or FIG. 7 so that the glass sheet emerging from the quenching station on the roller conveyor has the required distribution of regions of more highly toughened glass interspersed with regions of lesser toughened glass.

Alternatively or in addition localised gas jets may be directed against the lower surface of the glass sheet by gas supply nozzles 37 directed upwardly through the gaps between the rollers 57. When localised gas jets are directed against both the upper and lower surfaces of the glass sheets these are arranged to act on opposed regions of the two surfaces of the sheets.

Such a toughening pattern may not be produced over the whole of the glass sheet. Part only of the sheet may be subjected to the pulsed localised gas jets by providing nozzles 37 only over the path of the part of the sheet to be specially toughened. Only one nozzle may be employed to produce in a strip-shaped region of the sheet a linear distribution of areas of more highly toughened glass interspersed with regions of lesser toughened glass.

The toughening produced by the pulsed localised gas jets need not be superimposed on a generalised toughening but may be employed alone when the glass sheet is advanced on a roller conveyor or while suspended vertically from an overhead conveyor or while carried in a near-vertical position on a movable carriage. Because of the quenching action of the spill of gas over the glass surface between the gas jets impinging on the glass, there is a degree of lesser toughening of the regions of the glass which lie between the regions of more highly toughened glass produced by the pulsed gas jets. This may be effective over the whole of the sheet or over part only of the sheet with the rest of the sheet untoughened.

I claim:

1. A method of toughening a glass sheet comprising advancing the glass sheet through a quenching station where the sheet is subjected to at least one localised gas flow and pulsing that gas flow at a repetition frequency related to the speed of advance of the glass through the quenching station to induce in the glass a distribution of regions of more highly toughened glass interspersed with regions of lesser toughened glass.

2. A method according to claim 1, in which the glass sheet is advanced between flows of quenching gas at the quenching station to produce overall toughening of the glass, and said at least one localised gas flow is superimposed on said flows of quenching gas.

3. A method according to claim 2, in which the glass is advanced horizontally between said flows of quenching gas and is subjected to a plurality of said localised gas flows by directing towards at least one face of the glass, as it passes through the quenching station, gas jets which are spaced apart in a row transversely to the direction of advance of the glass, and pulsing said gas flows to produce said distribution of regions of more highly toughened glass interspersed with regions of lesser toughened glass in which distribution there are areas in which the principal stresses acting in the plane of the glass sheet are unequal.

4. A method according to claim 3, in which the advancing glass is subjected to an array of gas jets which are spaced apart in rows transversely of the direction of advance of the glass with the rows spaced apart in the direction of advance, and the gas jets are pulsed at a rate related to the speed of advance of the glass so that localised areas of the glass are subjected to accumulative chilling by successive pulsed jets.

5. A method according to claim 2, further comprising advancing the glass sheet horizontally through the quenching station on a gaseous support, and directing said at least one localised gas flow towards the upper face of the sheet at the quenching station.

6. A method according to claim 1, further comprising advancing the glass sheet horizontally through the quenching station on rollers, and directing said at least one localised gas flow towards the upper face of the sheet at the quenching station.

* * * * *